Sept. 4, 1951 — W. C. GRIFFIN — 2,567,161
EQUAL ARM BALANCE
Filed Oct. 8, 1947 — 5 Sheets-Sheet 1
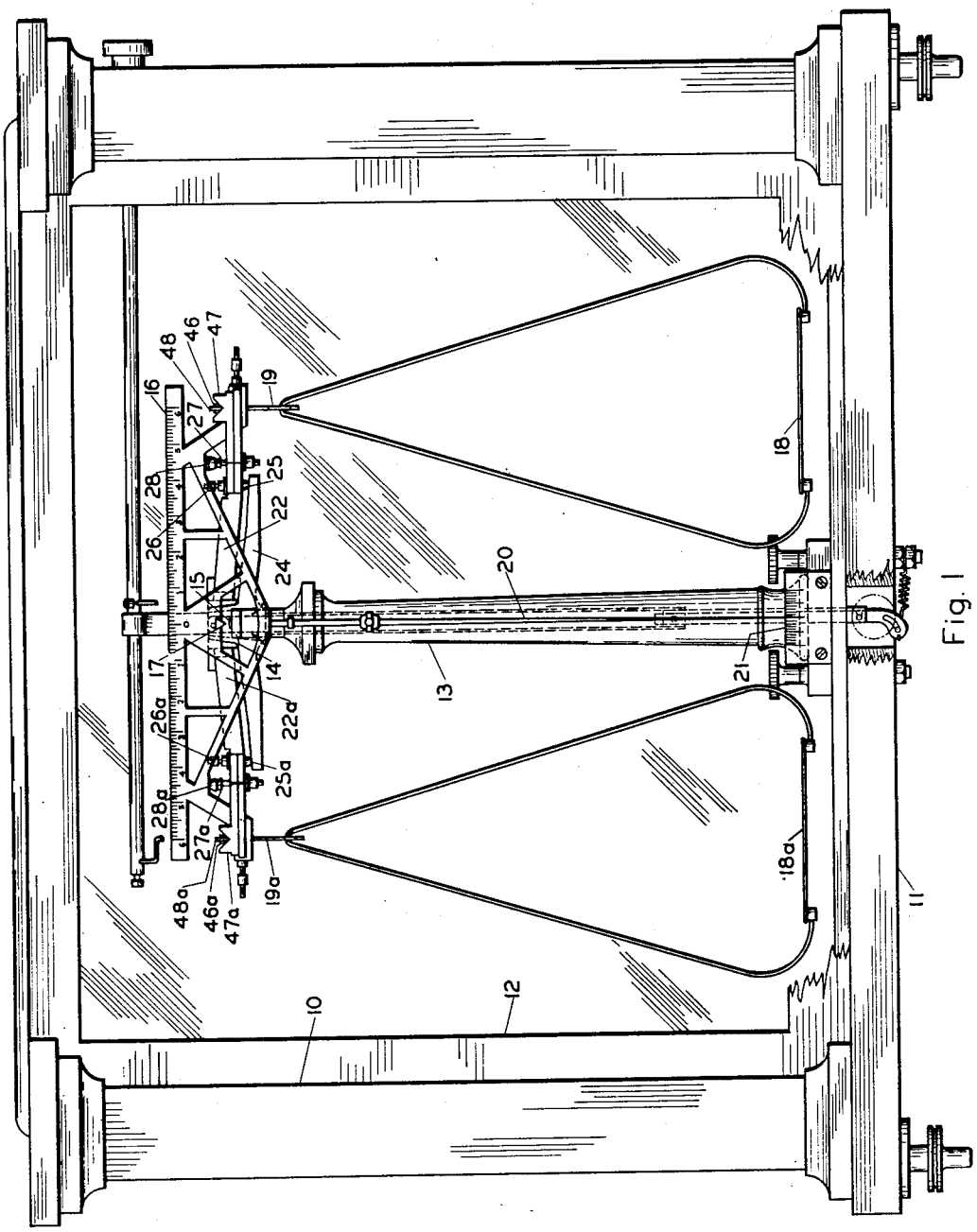
William C. Griffin,
INVENTOR.

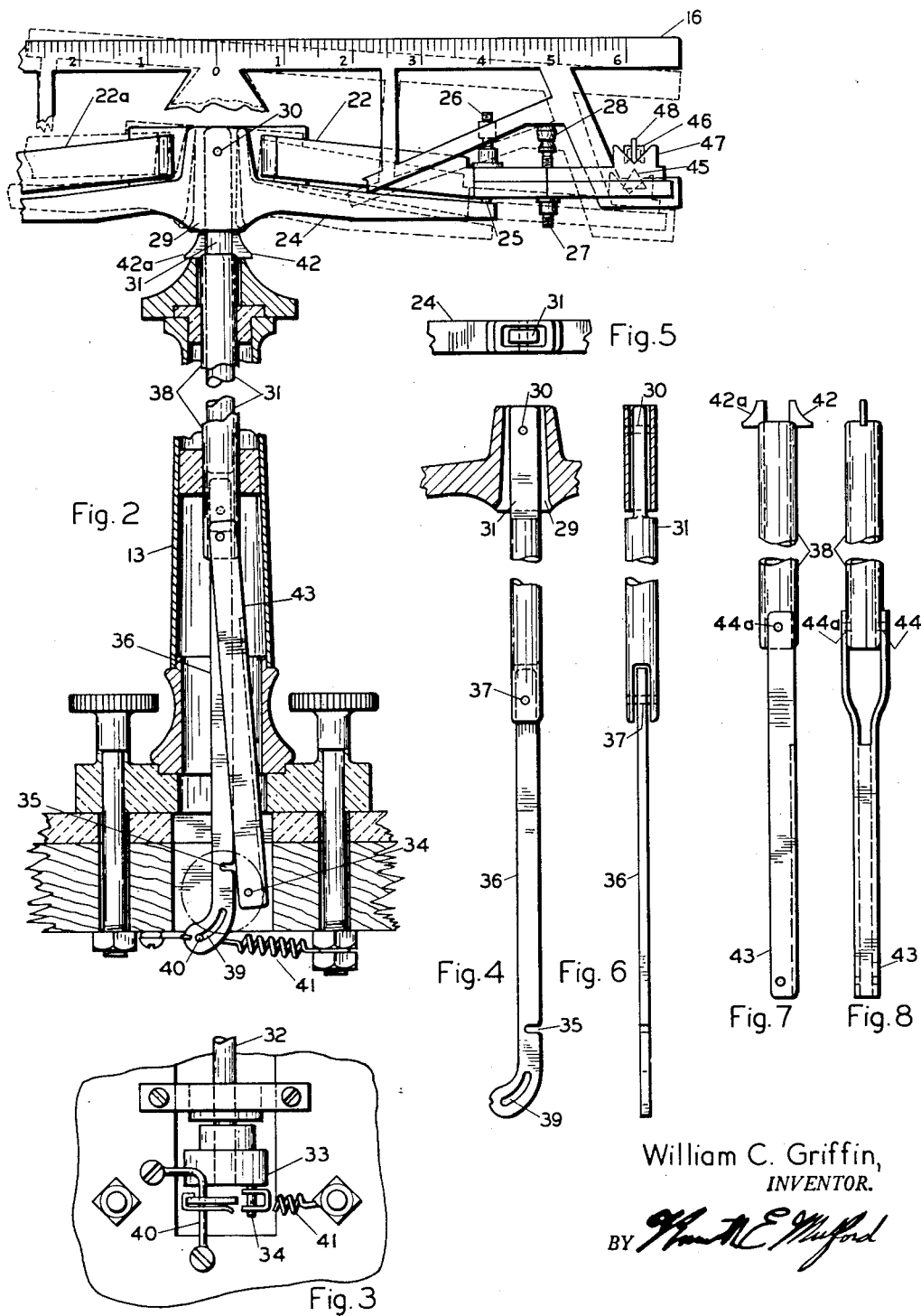

Sept. 4, 1951 W. C. GRIFFIN 2,567,161
EQUAL ARM BALANCE
Filed Oct. 8, 1947 5 Sheets-Sheet 3

William C. Griffin,
INVENTOR.

Sept. 4, 1951  W. C. GRIFFIN  2,567,161
EQUAL ARM BALANCE
Filed Oct. 8, 1947  5 Sheets-Sheet 4
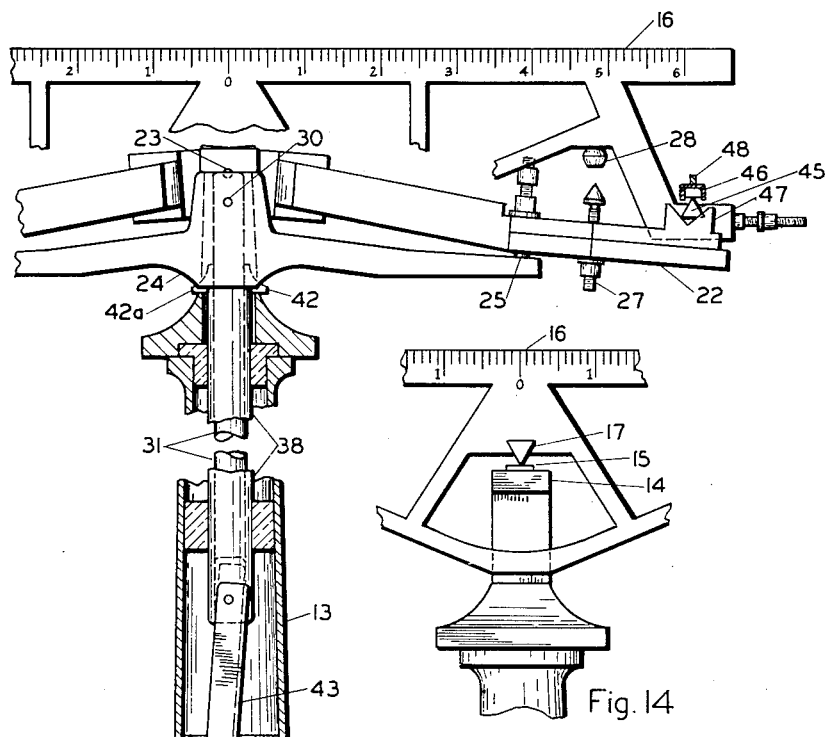
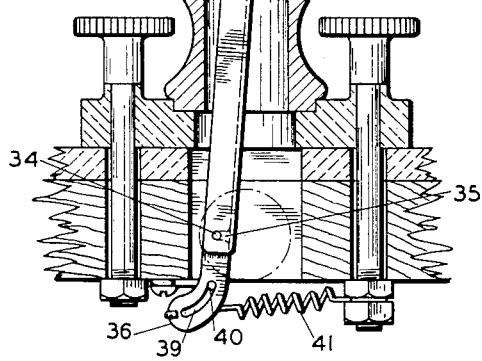
Fig. 13
William C. Griffin,
*INVENTOR.*

Sept. 4, 1951    W. C. GRIFFIN    2,567,161
EQUAL ARM BALANCE
Filed Oct. 8, 1947    5 Sheets-Sheet 5
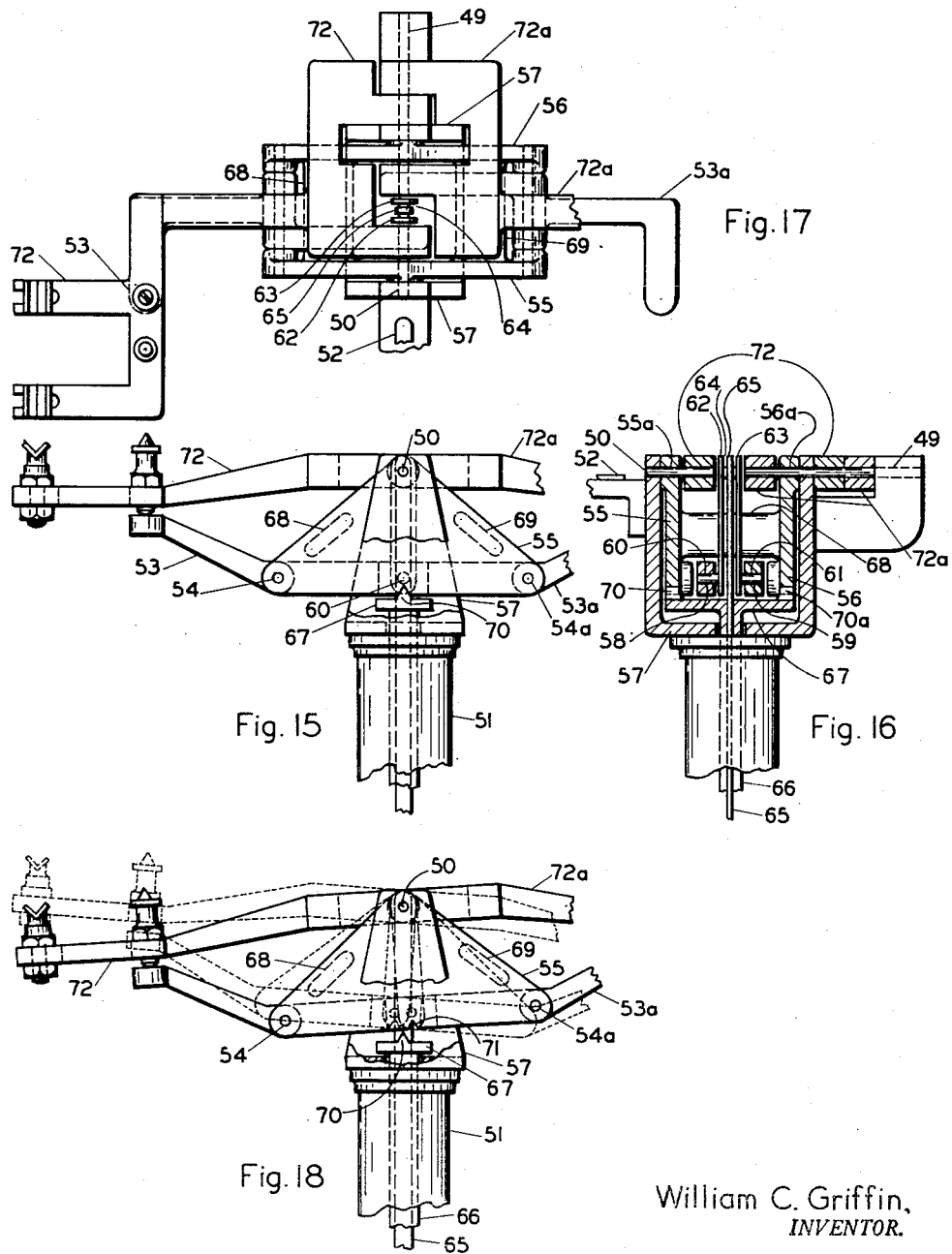
William C. Griffin,
INVENTOR.

Patented Sept. 4, 1951

2,567,161

UNITED STATES PATENT OFFICE 2,567,161

EQUAL ARM BALANCE

William C. Griffin, Newport, Del.

Application October 8, 1947, Serial No. 778,630

13 Claims. (Cl. 265—54)

This invention relates to improvements in balances for comparing weights or weighing articles, and more particularly it relates to improvements in analytical balances such as are used for analytical and assay work.

Balances of this kind have been designed so as to have a high sensitivity and in general are constructed with a balance beam hung at its middle upon a knife edge and having scale pans hung from its end knife edges, all enclosed within a case to protect the movable parts from disturbance from air currents. To maintain sensitivity, it is essential that these beam knife edges, as well as the planes which support the knife edges during weighing operations, be sharp and polished. To substantially avoid damage to them during weighing operations, a beam arrest system is commonly provided that disengages these balance beam knife edges from their respective supporting planes. Thus, whenever a weight is added to or removed from the balance pans, the beam is arrested, thereby disengaging the knife edges from the supporting planes.

This procedure is tedious and time-consuming and the sensitivity of the balance is materially reduced by the frequent engagement and disengagement of the beam knife edges with the supporting planes.

It is an object of my invention to provide an improved balance having novel means for effecting preliminary weighing operations without utilizing the sensitive knife edges in the preliminary weighing operations.

Another object of my invention is to devise said means in the form of a lift mechanism capable of being moved to disengage the sensitive knife edges from their supporting planes while the preliminary weighing operation is being effected.

Still another object of my invention is to devise said lift mechanism so that it is capable of serving as a beam arrest.

Further objects and objects relating to details of construction and advantages of use will more definitely appear from the detailed description to follow. Non-limiting structures constituting preferred embodiments of my invention as illustrated in the accompanying drawings form a part of the specification in which:

Figure 1 is a front elevational view of an analytical balance embodying my invention.

Figure 2 is a longitudinal partially sectional view on an enlarged scale of a portion of the balance shown in Figure 1.

Figure 3 is a bottom plan view of the portion of the balance shown in Figure 2.

Figure 4 is a front elevation partly in section of the interior member of the portion of the balance shown in Figure 2.

Figure 5 is a top plan view of the portion of the balance shown in Figure 4.

Figure 6 is a side elevation partly in section of the assembly shown in Figure 4.

Figure 7 is a front elevation of another interior portion of the balance as shown in Figure 2.

Figure 8 is a side elevation of the parts shown in Figure 7.

Figure 13 is a front elevational view partly in section similar to that shown in Figures 2 and 9 except that the parts are shown in still a different position.

Figure 14 is a detailed view showing the position of some of the parts which do not appear in Figure 13.

Figure 15 is a front elevation of a portion of another type of balance embodying the present invention.

Figure 16 is an end view partly in section of the balance portion shown in Figure 15.

Figure 17 is a top plan view of a portion of the balance shown in Figure 15.

Figure 18 is a front elevation showing the operation of the balance portion shown in Figure 15 when in a different position.

Figure 10:
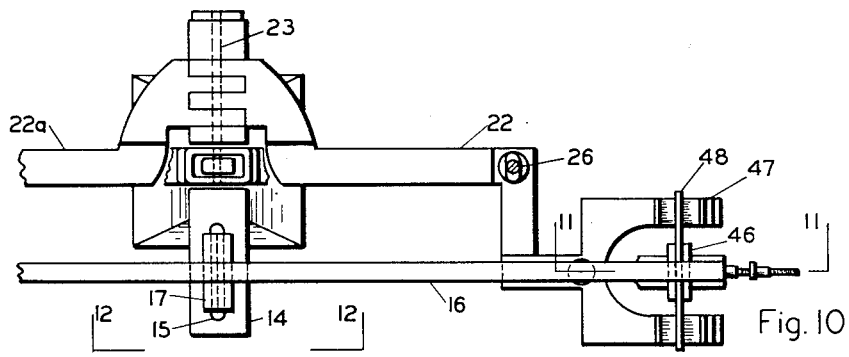
Figure 10 is a top plan view of the portion of the balance as shown in Figure 9.

Like numerals designate corresponding parts in all the figures of the drawings. The particular analytical balance shown in Figure 1 is selected merely for the purpose of illustrating my invention and is a laboratory balance, the same being enclosed within a conventional draft proof casing 10 erected upon a base 11 and having a sliding door 12 to give access to the enclosed weighing mechanism.

Referring particularly to Figures 1 to 14 of the drawings, the balance includes a support comprising base 11, central tubular body portion or column 13 mounted on the base, said column having at its upper end an arm 14. Arm 14 carries a central knife edge supporting plane 15 adapted to support the balance beam 16 by its central knife edge 17. Counterweight supporting means and mass (to be weighed) supporting means are carried at opposite ends of the balance beam, and in the type of balance illustrated these means comprise, respectively, pans 18 and 18a, suspended from the opposite ends of the beam by familiar terminal knife edges (of which the right hand knife edge 45 appears in Figures 2, 9, 11 and 13, it being understood that there are corresponding parts not shown in these figures on the left hand side of the balance) on the beam and corresponding terminal knife edge supports or planes 46 and 46a in the stirrups 19 and 19a.

The balance beam 16 may be of any preferred construction and may be provided with the usual adjustments and adjusting means employed for zero setting and increasing the sensitivity of the balance. The beam is provided with a long pointer 20, traversing graduations on a suitable index member 21, to indicate the periods of oscillation of the moving parts of the balance during weighing operations and show when it comes to poise.

The balance is provided with swinging stirrup support levers 22 and 22a, which are jointly pivoted at their inward ends on the pin 23 in the back of the upper portion of the central tubular body portion or column 13, as shown in Figure 10, and in line with the line of contact of the central knife edge 17. These levers are provided with adjustable pins 27 and 27a having upper ends which are ball or point shaped and which are in turn adapted to fit into members 28 and 28a (which may be flat, cupped, grooved or conically shaped) on the beam to lift the beam when the levers are raised. These levers carry, at their free ends, V-shaped stirrup supports 47 and 47a, which when raised lift the cross bars 48 and 48a of the stirrups to thereby lift the knife edge bearings of the stirrups off of the corresponding knife edges (such as right hand knife edge 45) of the beam. As the beam 16 is itself capable of being lifted by the stirrup levers, it can be seen that the stirrup support levers, when in raised position, take the loads of the various parts off of the knife edges. In Figures 1 to 12 the balance is shown with the knife edges so disengaged from their supporting planes.

Conventional balances generally comprise a beam arrest mechanism which may be moved to lift the balance beam, disengage its central knife edge bearing and hold the beam in rigid arrest position. Generally such beam arrests operate through the stirrup support levers and lift these levers to disengage not only the central knife edge bearing, but also the terminal knife edge bearings.

Conventional weighing operations on such balances constitute placing the object or material to be weighed on the left pan and one or more weights of approximate measure on the right pan while the balance beam is in lifted arrest position. The beam arrest mechanism is then lowered and the balance is thus in weighing position with the beam free to oscillate about the horizontal central knife edge as fulcrum. The relation of the weight of the mass to be weighed and the counterweight employed is observed by noting the angular swing of the beam about its fulcrum, and is ordinarily indicated by the position, relative to the index member, of the pointer attached to the beam. If it is observed that the weights placed on the right pan are too light or too heavy, the beam arrest is raised, the weights on the right pan are exchanged for lighter or heavier weights, and the beam arrest is again lowered. This operation is very tedious and time-consuming and must be continued until balance has been attained. Moreover, the frequent engagement of the knife edges with the knife edge supports or planes causes a dulling and oftentimes chipping of the knife edges and their supporting planes, which greatly impairs the sensitivity of the balance.

According to the present invention, I provide a novel lift mechanism which may be used to disengage the knife edges during the course of weighing operations, and in addition permits an expedient preliminary weighing of the object or material to be weighed when the knife edges are disengaged.

In the embodiment of the invention shown in Figures 1 to 14 this is accomplished by providing a second beam 24 having a hollow central portion 29 and pivotally hung by means of a central bearing in the upper end of the central hollow portion on bearing pin 30. As shown the center line of this second central bearing is substantially in alignment with the line of contact of the central knife edge bearing and this construction constitutes a preferred embodiment of the invention. However, if the second central bearing is to be located at a position not substantially in alignment with the line of contact of the central knife edge bearing, the center line of the second central bearing and the line of contact of the said central knife edge bearing should nevertheless be substantially within a single vertical plane.

As shown in detail in Figures 4 and 5 the outer ends of the pin 30 are held in opposite sides of the hollow portion of the beam and the central portion of the pin 30 passes through a hole in the upper end of the slide member 31 which serves as bearing support for pin 30. Slide member 31 is adapted to be raised and lowered to lift and lower the beam 24 and is provided at its lower end with suitable mechanism, hereinafter more fully described, for this purpose.

Beam 24 is located below the swinging stirrup support levers 22 and 22a, said beam when in raised position contacting the lower ends 25 and 25a of the lift guide pins 26 and 26a to lift the stirrup support levers.

As shown in Figures 4 and 6 the slide member 31 consists of a rod of circular or other suitable cross section and is adapted to be moved vertically upward or downward within the column by means of a turning movement of thumb wheel shaft 32 shown in Figure 3. This turning movement is translated into a vertical movement through the agency of a collar 33, having located adjacent to its circumference, a pin 34 adapted to fit into slot 35 in the link 36 which is pivotally connected at its upper end to the lower end of slide member 31 by means of pin 37.

Figure 9:
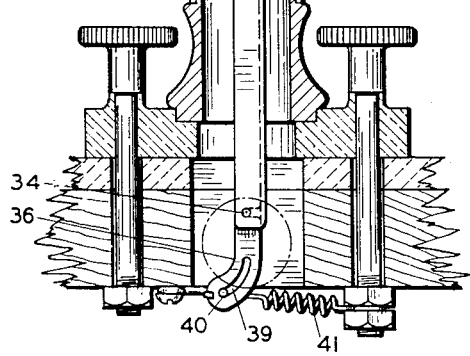
Figure 9 is a front elevational view partly in section similar to that of Figure 2 except that the parts are shown in a different operating position.

As shown in Figure 13, beam 24, slide member 31, and link 36 are in a lowered position with pin 34 in slot 35. When the collar 33 is turned clockwise, the link slide member and beam are raised by pin 34 until the pin reaches the highest position as shown in Figure 9. Further clockwise movement of the collar 33 disengages pin 34 from slot 35, the pin moving into the position shown in Figure 2. This latter movement of pin 34 from the position shown in Figure 9 to the position shown in Figure 2 may be used to actuate some other portion of the mechanism, as for example, sleeve 38 to be hereinafter more fully described.

In order to guide the travel of link 36, it may be provided at its lower end with a curved elongated slot 39 through which passes a suitable fixed guide pin 40. A spring 41 suitably connected to the base of the balance and to the lower end of link 36 retains the beam 24, slide member and link in uppermost position after pin 34 has disengaged from slot 35.

As can be seen in Figures 1 and 2 when the beam 24, slide member 31 and link 36 are in uppermost position and the pin 34 has passed out of engagement with the slot 35, the beam 24 has lifted the swinging stirrup support levers 22 and 22a which have in turn lifted the beam so that all of the beam knife edges are disengaged from their supporting bearings, the principal weight of the stirrup support levers and the balance beam 16 being carried by beam 24 at 25 and 25a to the sides of the bearing 30. However, the beam 24, instead of being in a fixed rigid position, as in the case of a conventional balance in arrest position, is supported by the central bearing 30 and is capable of pivoting about this bearing pin as shown in dotted lines in Figure 2.

As the pin 30 and the pin 23, upon which the inner ends of the stirrup support levers 22 and 22a are jointly pivoted, are each in approximate alignment with the disengaged central knife edge 17, the entire assembly, comprising the beam 24, the stirrup support levers 22 and 22a, the beam 16, the stirrups 19 and 19a, and the suspended pans 18 and 18a, is supported by and capable of swinging about the pins 30 and 23 as indicated in dotted lines in Figure 2. In addition cross bars 48 and 48a of the stirrups 19 and 19a are free to swing on and are in bearing engagement with the V-shaped members 47 and 47a in the outer ends of the stirrup support levers. This permits a preliminary weighing to be accomplished with all knife edges disengaged, with pins 30 and 23 serving as the fulcrum and principal bearing support, and with the cross bars 48 and 48a and corresponding V-shaped members 47 and 47a serving as outer pan support bearings. After the preliminary weighing is accomplished the beam 24 may be lowered to the position shown in Figure 13 with the resultant lowering of stirrup support levers 22 and 22a and the placement of the knife edges upon their bearings in position for final weighing. While, in the embodiment of the invention shown, the fulcrum and principal bearing support (when the knife edges are disengaged) is in the form of the bearing pins 30 and 23, it will be understood that either or both of these pins may be in the form of more elaborate bearings such as roller bearings, ball bearings, or the like. Likewise, the outer bearings between the cross bars 46 and 46a and V-shaped members 47 and 47a may be jeweled or otherwise refined if so desired.

When the lift mechanism is to be operated to engage or disengage the knife edge, it is preferable that beam 24 be held in a rigid horizontal (true arrest) position, and in accordance with an embodiment of the invention means are provided for locking the said beam in such position.

In the embodiment of the invention shown in Figures 1 to 14, this locking arrest means comprises a second slide member in the form of a sleeve 38 about the slide member 31, said sleeve having at the upper end thereof oppositely positioned lugs 42 and 42a adapted to fit into locking engagement with the lower end of the hollow portion 29 of the beam 24 to hold the latter in rigid horizontal position. The sleeve 38 is mounted within column 13 and is adapted to be moved vertically upwardly or downwardly within the column 13.

As shown in Figures 2, 7, and 8, the sleeve 38 is raised and lowered by means of a link member 43. The lower end of link 43 is pivoted to and operated by the pin 34 on the collar 33 on the thumb wheel shaft 32. The upper end of link 43 is in the form of a yoke attached at its upper end by means of pins 44 and 44a to the lower end of the sleeve 38. The lower portion of link 43 is in the form of a U-shaped channel within which the link 36 of the slide member 31 can operate without interfering with the link 43.

Figure 11:
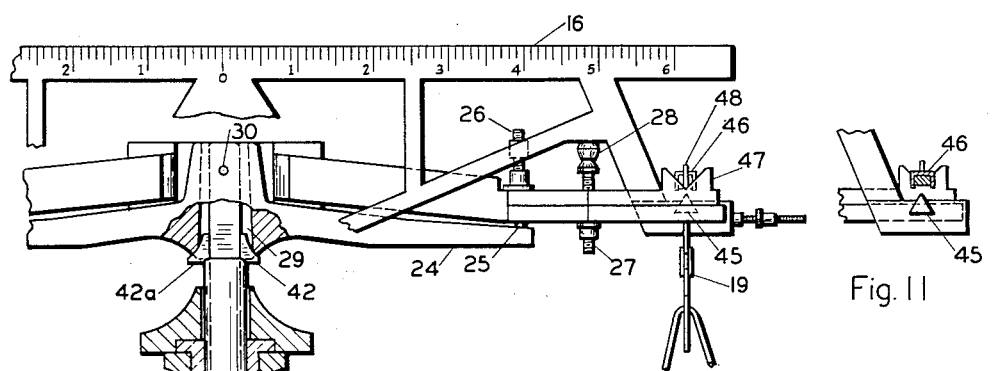
Figure 11 is a detailed view partly in section of a portion of the balance shown in Figure 9.
Figure 12:
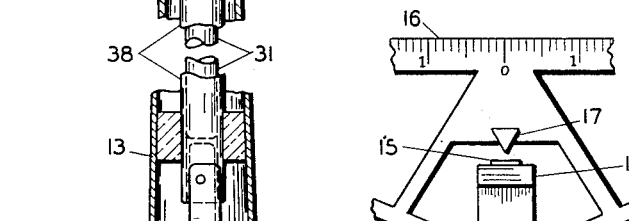
Figure 12 is a detailed view showing the position of some of the parts which do not appear in Figure 9.

When carrying out a weighing operation in accordance with this preferred embodiment of my invention, the balance is first leveled and adjusted to equilibrium after which the balance is placed in arrest and the beam lift mechanism being in the position shown in Figure 9 with the central balance knife edge 17 and the terminal knife edges (such as 45) out of engagement with their respective supporting planes (such as 46) as shown in Figures 11 and 12. It will also be noted that in this position, link 36, pivoted to slide member 31, and link 43, pivoted to sleeve 38, are in vertical alignment and that pin 34 to which link 43 is pivoted at its lower end is abutting the inner end of slot 35. The object or material to be weighed is now placed upon the balance pan 18a and the approximate weights to counterbalance the object or material to be weighed are placed upon the balance pan 18. The thumb wheel shaft 32 is then turned clockwise with the result that pin 34 lowers link 43 and sleeve 38 until the lugs 42 and 42a are out of engagement with the beam 24, as shown in Figure 2. During this phase of the operation, the collar 33, carries the pin 34 out of slot 35, the slide member 31 and its link 36 remaining stationary and being stopped by pin 40 in the lower end of slot 39, this position of link 36 being maintained by spring 41. As a result, the beam 24 is free to oscillate with the balance beam and the swinging stirrup levers 22 and 22a while the central knife edge of the beam as well as the terminal knife edges are still disengaged from their respective supporting planes. Thus, without engaging the beam knife edges with the knife edge planes, weights of appreciable size may be added to or removed from the balance pan until approximate balance is attained. Since there is no need to arrest the beam with each addition or removal of weights during this preliminary weighing operation, the weighing operation is expedited and the weight of an object or material can be approximated within close limits. After the weight of the object or material being weighed has been preliminarily determined, the pin 34, sleeve 38, lugs 42 and 42a, and link 43 are raised to the position shown in Figure 9 by turning the thumb wheel shaft 32 counterclockwise for a distance sufficient to permit the pin 34, attached to the collar 33, to fully engage the slot 35. In this position the links 36 and 43 are brought into alignment, the lugs 42 and 42a of the sleeve 38 are within the hollow portion 29 of the beam 24 for a distance sufficient to lock the beam 24 in horizontal position with the result that the central knife edge 17 and the terminal knife edges 45 and 45a remain disengaged from their respective supporting planes and the balance is in conventional or true arrest position.

To complete the weighing operation, the beam lift assembly is lowered to the position shown in Figures 13 and 14, whereby the central knife edge 17 and the terminal knife edges, 45 and 45a engage their respective supporting planes. To accomplish this, the thumb wheel shaft 32 is turned counterclockwise so that pin 34 lowers links 36 and 43, thus lowering slide members 31 and 38. Guide slot 35 retains link 36 in such position that pin 34 is held so as to fully engage slot 35. Experience has shown that in many instances, after preliminary weighing, balance of the object or material being weighed may be attained in the final phase of the weighing operation only by use of suitable rider or chain weight (not shown).

Figures 15 to 18 illustrate another type of balance construction embodying the present invention.

As shown in these figures, swinging stirrup support levers 72 and 72a have bearings at their inner yoke-like ends where they are pivoted on journals of aligned pins 49 and 50 held in the upper ends of a support comprising rigid member 57 mounted on column 51. The front of member 57 is provided with an arm carrying a central knife edge supporting plane 52 for a balance beam not shown. The stirrup support levers 72 and 72a are provided with pins to engage the balance beam, and with V-shaped stirrup supports at their outer ends in the same manner as support levers 22a and 22 in Figure 1. Like the operation of the balance of Figure 1, upward movement of the stirrup support levers 72 and 72a lifts the central knife edge of the balance beam from its supporting plane and also lifts the knife edge bearings of the stirrups (not shown) off the corresponding knife edges of the beam.

In the embodiment of the invention shown in Figures 15 to 18, however, the lift mechanism comprises two levers 53 and 53a fulcrumed on bearing rods 54 and 54a, respectively. The outer ends of these rods are held in the lower corners of two oppositely positioned plate-like members 55 and 56, each of which is provided at its upper end with a bearing 55a and 56a, these bearings being respectively journaled on aligned pins 50 and 49. Pins 49 and 50 are preferably substantially in alignment with the line of contact of the balance beam knife edge bearing of which supporting plane 52 is shown in Figures 16 and 17.

Members 55 and 56 are rigidly connected by suitable means such as plates 68 and 69 extending between them and form a second beam pivotally hung on bearings 55a and 56a.

It will be understood that while the stirrup support levers and the second beam are shown as pivoted on the same bearing pins, separate bearing pins could be provided. However, the center line of the bearing upon which the second beam is hung, if not substantially in alignment with the line of contact of the central knife edge bearing, should be substantially within the same vertical plane as the line of contact of the central knife edge.

The inner ends of levers 53 and 53a are oppositely offset and are provided with bearings 58 and 59, respectively, carried by the bearing pins 60 and 61 at the lower ends of links 62 and 63. These links are carried at their upper ends by the outer ends of pin 64 the center of which is a journal carried by a bearing in the upper end of slide member 65. This slide member extends downwardly through column 51 and may be raised or lowered by suitable mechanism, not shown, at the bottom of column 51.

A second slide member comprising sleeve 66 within column 51 and about slide member 65 is also adapted to be raised and lowered by means of suitable mechanism at the bottom of column 51. Sleeve 66 carries at its upper end a T-shaped member 67, the cross of the T being provided at each of its opposite ends with an upwardly projecting lug, 70 and 70a, adapted to fit into locking engagement with corresponding recesses in the center of the lower edges of members 55 and 56. In Figure 18 recess 71 in plate 55 is shown out of engagement with lug 70, whereas in Figures 15 and 16 the lugs are in locking engagement with plates 55 and 56.

As shown in Figures 15 and 16 slide member 65 is in its lower position with pin 64 in alignment with pins 49 and 50. Through pin 64, links 62 and 63, and bearing pins 60 and 61, slide member 65 holds the inner ends of levers 53 and 53a, in downward position, with the result that the outer ends of these levers, which fulcrum about rods 54 and 54a, have engaged and lifted swinging stirrup support levers 72 and 72a. When so lifted the stirrup support levers in turn lift the balance beam and the stirrups (not shown) so that all of the knife edge bearings are disengaged.

As shown in Figures 15 to 17 sleeve 66 is in raised position with lugs 70 and 70a in, and in locking engagement with, the corresponding recesses in the lower edges of plate-like members 55 and 56. As a result the entire lift mechanism is in rigid arrest position.

By lowering sleeve 66 and T-shaped member 67 to the position shown in Figure 18, lugs 70 and 70a are disengaged from the recesses in members 55 and 56 with the result that the beam formed by members 55 and 56 is capable of swinging about the bearings 55a and 56a from which it is pivotally hung. The principal weight of the balance beam, the stirrups, the stirrup support levers, and levers 53 and 53a are carried by the beam formed by members 55 and 56 at the fulcrums 54 and 54a of the last mentioned levers. Levers 53 and 53a and their carrying links 62 and 63 are in turn capable of swinging about pin 64. The stirrup support levers 72 and 72a are likewise capable of swinging about their bearings on pins 50 and 49.

As the balance beam is carried by the levers 72 and 72a and the stirrups are free to swing on and are in bearing engagement with the V-shaped members at the outer ends of these levers, a preliminary weighing may be accomplished with all sensitive knife edges disengaged and with aligned pins 49, 50 and 64 serving as the fulcrum and principal bearing support and with the V-shaped members at the outer ends of levers 72 and 72a serving as outer pan support bearings.

When the weight of the object or material has been preliminarily determined and the oscillations indicated in Figure 18 cease, the beam and arrest mechanism reach a substantially horizontal position. Sleeve 66 and T-shaped member 67 are then raised to engage and lock members 55 and 56 in rigid arrest position. Slide member 65 is then raised to lift the inner ends of levers 53 and 53a through pin 64, links 62 and 63 and bearing pins 60 and 61. By this movement the outer ends of levers 53 and 53a are lowered and in turn lower stirrup support levers 72 and 72a. As with the lowering of stirrup support levers 22 and 22a of the balance shown in Figure 1, the lowering of stirrup support levers 72 and 72a permits the central knife edge of the beam and the terminal knife edges to engage their respective supporting planes, after which final precision weighing can be accomplished.

It will be understood that the portion of the lift mechanism of the present invention that is free to oscillate during the weighing operation should be constructed so that the parts on one side of the central bearing pin, or pins, counterbalance the parts on the other side of the said pin, or pins, and that said portion of the lift mechanism may be provided with one or more adjustable weights, such as those customarily found at the outer ends of balance beams, for the purpose of adjusting the balance of the lift mechanism so that the pointer 20 is at zero position when the lift mechanism is in preliminary weighing position and the pans are empty.

In the embodiments of the invention shown in the drawings, the lift mechanism is actuated by and comprises a slide member movably mounted within the column, this location being convenient and highly suitable. However, it is to be understood that the lift mechanism may be located entirely outside of the column if so desired.

As the lift mechanism of the present invention has as a primary purpose the conservation of the sensitive knife edges and their supporting planes, it has been illustrated as applied to analytical balances having stirrup support levers which in themselves tend to prevent impairment of the sensitivity of the knife edge bearings. However, the lift mechanism of the present invention and comprising a second beam pivotally mounted for the purpose of conducting a preliminary weighing may be applied to other types of balances.

The second beam can be employed to lift and carry only the mass supporting means and the counterweight supporting means leaving the balance beam in its normal position if desired. In the structure illustrated in Figures 1 to 14, this is readily accomplished by retraction of the adjustable pins 27 and 27a in their respective threaded mounts so that the pins do not engage the members 28 and 28a of the balance beam when the arrest structure is in fully elevated position. The stirrup supports 47 and 47a engage and lift the cross bars 48 and 48a of the stirrups thus picking up the load of the mass and counterweight supporting means and transmitting the load to the second beam.

Alternatively, the second beam can be operated to lift the balance beam alone without disengaging the mass and counterweight supporting means from the balance beam. For example, in the structure illustrated in Figures 15 to 18, this can be accomplished by the removal of the threaded stirrup support studs from the opposite ends of the stirrup support levers 72 and 72a leaving the balance beam lifting pins alone on the said levers. The same effect can be attained in the structure illustrated in Figures 1 to 14 by elevating the adjustable pins 27 and 27a so that on lifting the arrest structure they engage the members 28 and 28a and so lift the balance beam before the stirrup supports 47 and 47a engage the cross bars 48 and 48a of the stirrups thus preventing the engagement and lifting of the stirrups.

In the specification and claims reference is made to "knife edge plane." It is to be understood that these terms are terms of the balance art and mean the surface adapted to contact the knife edge during the weighing operation which surface need not be geometrically plane as it is frequently concave or in the form of a trough.

Having fully described my invention, what I claim is as follows:

1. In a balance, having a support, a balance beam, a balance beam bearing having knife edge and knife edge plane elements one of which is carried by said support and the other is carried by said balance beam intermediate its ends, mass to be weighed supporting means vertically disengageably carried by said balance beam at one side of said bearing, and counterweight supporting means vertically disengageably carried by said balance beam at the other side of said bearing; preliminary weighing means including a second beam, a second bearing for said second beam intermediate the ends thereof, members for engaging and lifting said supporting means to disengage the same from said balance beam, means for transmitting weight between the said members and the respective opposite ends of said second beam, and selectively operable means for moving said members into engaging and lifting relation with said supporting means.

2. A balance as set forth in claim 1 and wherein the said second bearing is in substantial alignment with the line of contact of the knife edge bearing.

3. In a balance having a support, a balance beam, a balance beam bearing having knife edge and knife edge plane elements one of which is carried by said support and the other is carried by said balance beam intermediate its ends, mass to be weighed supporting means carried by said balance beam at one side of said bearing, and counterweight supporting means carried by said balance beam at the other side of said balance beam; preliminary weighing means including a second beam, a second bearing for said second beam intermediate the ends thereof, movable mean for engaging and lifting said balance beam to disengage the knife edge bearing thereof, means for transmitting weight from said movable means to the said second beam through positions on opposite sides of said second bearing to permit the second beam to function as a preliminary balance beam, and selectively operable means for moving said movable means into engaging and lifting relation with the first said balance beam.

4. A balance as set forth in claim 3 and wherein the said second bearing is in substantial alignment with the line of contact of the knife edge bearing, when the balance beam is in lifted position.

5. A balance having a support, a balance beam, a balance beam bearing having knife edge and knife edge plane elements, one of which is carried by said support and the other is carried by said balance beam intermediate its ends, a weighing pan stirrup at each end of said balance beam, a stirrup knife edge bearing for each of said stirrups, each bearing comprising knife edge and knife edge plane elements, one of which is carried by the stirrup and the other is carried by said balance beam at an end thereof, swinging stirrup support levers pivotally mounted at their inner ends on bearings substantially in alignment with the line of contact of said balance beam knife edge bearing and engageable with said stirrups to lift the same and disengage the respective stirrup knife edge bearings, means connected to said stirrup support levers to engage and lift said balance beam to disengage the knife edge bearing thereof when said levers are swung to engage said stirrups, a preliminary balance beam, a bearing for said preliminary balance beam located intermediate the ends thereof and in substantial alignment with the line of contact of the said balance beam knife edge bearing, and selectively operable means for moving said preliminary balance beam to bring a portion thereof lying at one side of its bearing into operating engagement with one of the swinging stirrup support levers and a portion lying at the opposite side of its bearing into contact with the other of the swinging stirrup support levers to swing the said stirrup support levers to engage and lift the stirrups and the balance beam to disengage the respective knife edge bearings thereof and to transmit the weight to the preliminary balance beam for a preliminary weighing.

6. In a balance, a support comprising a tubular column, a balance beam, a balance beam bearing having knife edge and knife edge plane elements one of which is carried by said support and the other is carried by said balance beam intermediate its ends, mass to be weighed supporting means mounted at one end of said balance beam, counterweight supporting means mounted at the other end of said balance beam, a second beam, a bearing for said second beam located intermediate the ends thereof and in substantial alignment with the line of contact of the said balance beam knife edge bearing, a slide member movably mounted in said tubular column, selectively operable means for raising and lowering said slide member, and balance beam engaging means connected to said second beam and operable by said slide member to lift said balance beam to disengage the balance beam knife edge bearing and place the weight of said balance beam and the supporting means mounted thereon on the second beam in preliminary weighing relation.

7. A balance as set forth in claim 6 wherein the said second beam has a hollow central portion and the bearing for said beam is supported on the upper portion of said slide member, the balance further having a second slide member movably mounted in said tubular column and engageable in one position with the hollow central portion of said second beam to lock the same, and selectively operable means for moving said second slide member into and out of engagement with the second beam.

8. In a balance, a support comprising a tubular column, a balance beam, a balance beam bearing having knife edge and knife edge plane elements one of which is carried by said support and the other is carried by said balance beam intermediate its ends, a stirrup at each end of the balance beam, a bearing for each of said stirrups each bearing having knife edge and knife edge plane elements, one of which is carried by an end of the balance beam and the other is carried by the stirrup, swinging stirrup support levers pivotally mounted on their inner ends on bearings substantially in alignment with the line of contact of said balance beam knife edge bearing and engageable with said stirrups to lift the same and disengage the respective stirrup knife edge bearings, said levers also being engageable with said balance beam to lift and disengage the knife edge bearing thereof when said levers are swung to engage said stirrups, a second beam, a first slide member mounted for vertical movement within said tubular column, a pivotal connection between said first slide member and a central portion of said second beam, said connection being in substantial alignment with the line of contact of the said balance beam knife edge bearing, said second beam being carried into weighing engagement with said swinging stirrup support levers when said first sliding member is lifted to swing said levers to cause them to lift the stirrups and the balance beam, a second slide member mounted for vertical movement within said tubular column, cooperating disengageable locking means on said second beam and on said second slide member to prevent oscillation of the second beam when the second slide member is in lifted position, raising and lowering mechanism for selectively raising and lowering said first and second slide members together in one selected operation and for lowering said second slide member while leaving the first slide member in raised position in another selected operation.

9. In a balance, a support comprising a tubular column, a balance beam, a balance beam bearing having knife edge and knife edge plane elements, one of which is carried by said support and the other is carried by said balance beam intermediate its ends, mass supporting means mounted on one end of said balance beam, counterweight supporting means mounted on the other end of said balance beam, a balance beam lift mechanism comprising a second beam pivotally hung on said support by means of a second central bearing substantially in alignment with the line of contact of the balance beam knife edge bearing, balance beam lifting levers fulcrumed on said second beam at points to the sides of said second central bearing, and a slide member movably mounted within said column, the upper end of said slide member being connected to the inner ends of said levers whereby downward movement of said slide member raises the outer ends of said levers to lift the said balance beam, the principal weight of the mass supporting means and the counterweight supporting means being carried through said levers at the fulcrums thereof on the said second beam when said balance beam is in lifted position, said second beam being capable of oscillating about said second central bearing to permit a weighing operation when the said slide member is in raised position.

10. A balance as set forth in claim 9 wherein the said second beam has a recess between the fulcrum of the balance beam lifting levers, the balance further having mounted in said tubular column a second slide member carrying a projection engageable in one position with the recess of the said second beam to lock the same, and selectively operable means for moving said second slide member and its projection into and out of engagement with the second beam.

11. In a balance comprising a support, a balance beam, a sensitive weighing bearing having disengageable bearing elements carried respectively by said support and said balance beam, and mass to be weighed supporting means and counterweight supporting means carried by said balance beam at opposite sides of said bearing; a preliminary weighing beam, a support for said preliminary weighing beam, cooperating preliminary weighing bearing elements carried respectively by the preliminary weighing beam and by its support, and selectively operable means including said last mentioned support for disengaging said sensitive weighing bearing elements and imposing the weight of said supporting means on said preliminary weighing beam to permit a preliminary weighing operation upon the preliminary weighing bearing elements.

12. In a balance comprising a sensitive weighing balance beam, a support for said beam, a knife edge bearing element centrally located on said beam, a cooperating knife edge bearing element on said support, mass to be weighed supporting means disengageably carried at one end of said beam, and counterweight supporting means disengageably carried at the other end of said beam; a preliminary weighing beam, a support for a preliminary weighing bearing, a preliminary weighing bearing having cooperating elements carried respectively by the said preliminary weighing beam and the last said support, and selectively operable means including the last said support for disengaging both of said supporting means from the said sensitive weighing beam and imposing the weight of said supporting means onto opposite ends of said preliminary weighing beam.

13. A balance having a sensitive weighing beam provided with a disengageable fine weighing central bearing, beam lifting elements engageable with said weighing beam at opposite sides of said bearing, a member rigidly supporting said lifting elements when in engagement with said weighing beam, said lifting elements and said member constituting a preliminary weighing beam, a pivotal central support for the preliminary weighing beam, and selectively operable means for moving said lifting elements into engagement with said sensitive weighing beam to lift the same and disengage the fine weighing bearing, the sensitive weighing beam being carried by the preliminary weighing beam in the lifted position of the former whereby a preliminary weighing operation can be performed.

WILLIAM C. GRIFFIN.

REFERENCES CITED

The following references are of record in the file of this patent:

UNITED STATES PATENTS

| Number | Name | Date |
| --- | --- | --- |
| 2,271,809 | Thompson | Feb. 3, 1942 |